Sept. 13, 1949.   C. S. POOLE   2,482,027
VEHICLE SCALE
Filed Dec. 11, 1946   2 Sheets-Sheet 1
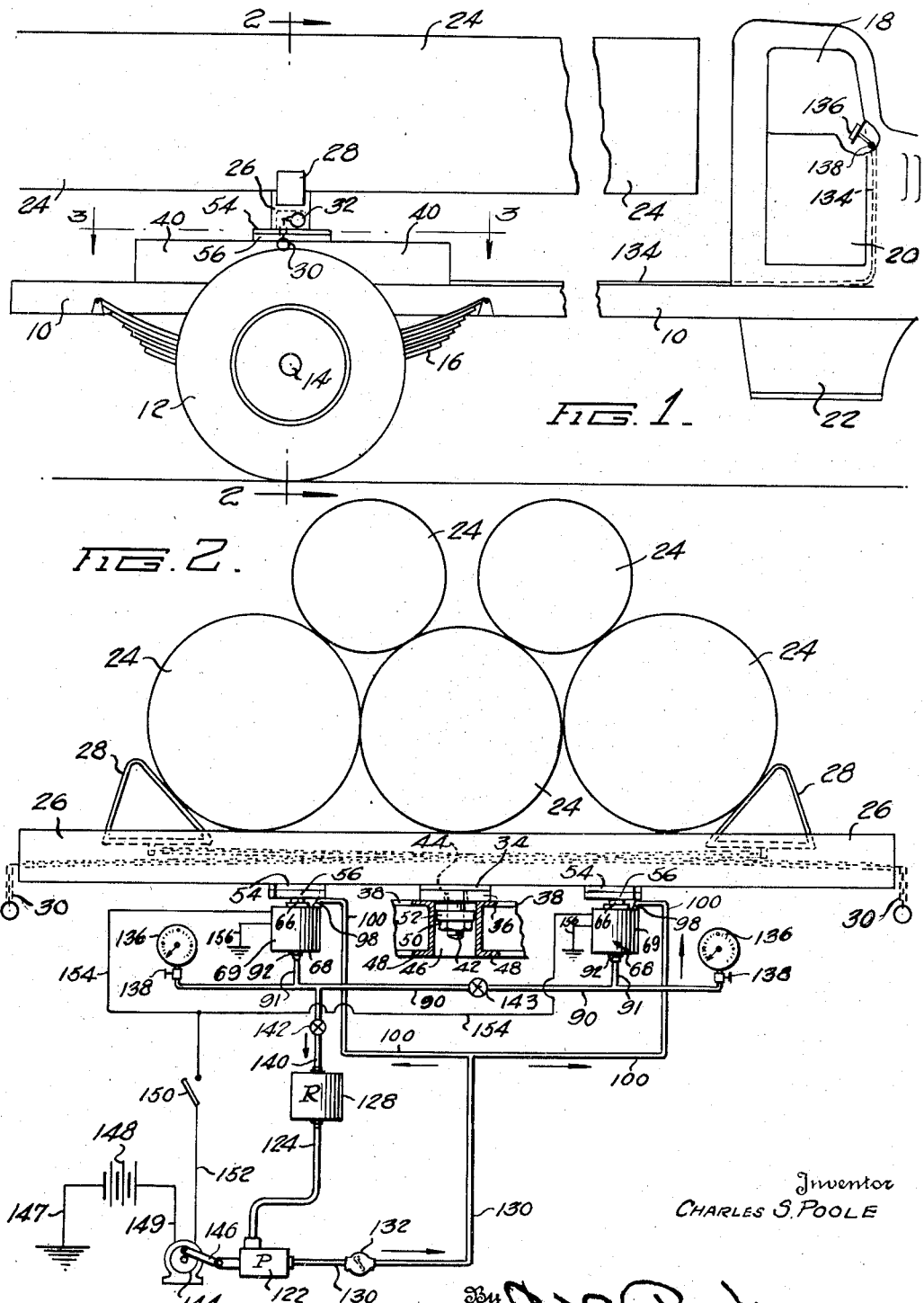
Inventor
CHARLES S. POOLE
By C. R. Parker
Attorney Sept. 13, 1949.  C. S. POOLE  2,482,027
VEHICLE SCALE
Filed Dec. 11, 1946  2 Sheets-Sheet 2
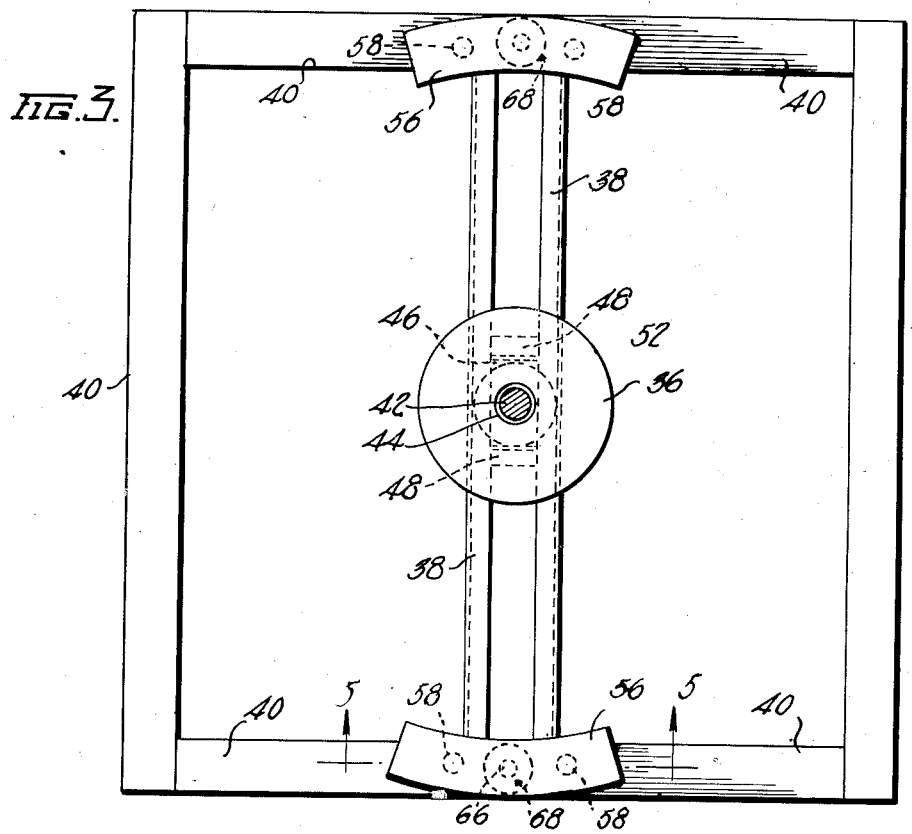
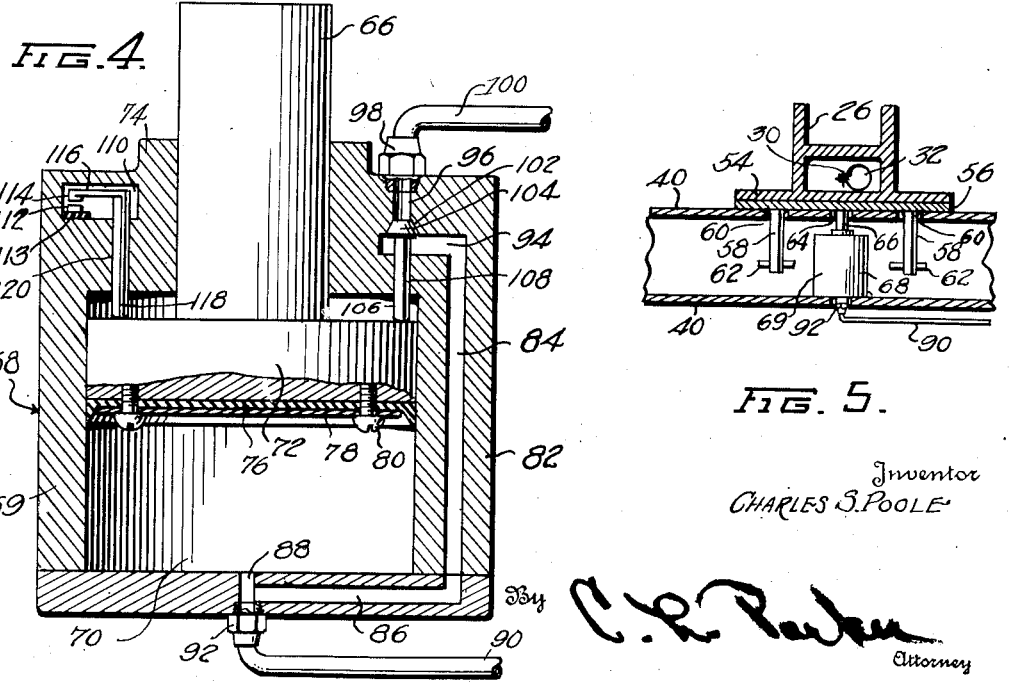
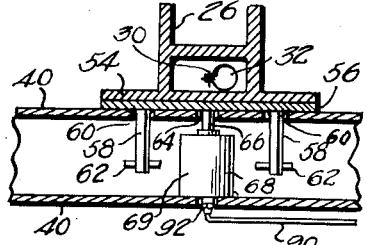
Inventor
CHARLES S. POOLE
By C. L. Parker
Attorney Patented Sept. 13, 1949

2,482,027

UNITED STATES PATENT OFFICE 2,482,027

VEHICLE SCALE

Charles S. Poole, Los Angeles, Calif.

Application December 11, 1946, Serial No. 715,537

5 Claims. (Cl. 265—40)

The present invention relates to a weighing apparatus and more particularly to an apparatus for weighing loads on vehicles.

In the logging industry where large trees are stripped and felled at widely scattered locations remote from the saw mill or other central point and where subsequent operations are to be performed to convert the logs into usable lumber, it is customary to employ heavy duty vehicles such as tractor trucks, or the like to transport the logs from the cutting site to such central location. In the usual course of such transportation it is frequently necessary for these vehicles to travel over the public highways and as a result they become subject to certain laws and regulations of the state relating to the maximum permissible load upon state highways. Since extremely heavy penalties are customarily provided for violations of the state laws occasioned by overloading such vehicles beyond the maximum limits, it is a matter of primary importance to operators and others in the logging industry to determine in advance the total weight of the logs constituting the vehicle load and to insure that such weight does not exceed the maximum limits specified by such state statutes and regulations.

The problem involved, however, is not one capable of easy solution by merely weighing the logs at the cutting site for the principal reason that such logs are usually so extremely heavy that any suitable type of weighing equipment would necessarily be heavy itself and could not practicably be continuously moved from place to place as the logging crews advanced to new locations. On the other hand these cutting sites are generally extremely rough and the unevenness of the terrain upon which the loading operation ordinarily takes place is such as to render conventional vehicle carried weighing systems of the type known to the prior art ineffective due to the unbalance of the load under such circumstances. Furthermore, due largely to the many variable factors entering into the estimation of the weight of individual logs such as density, moisture content, over-all dimensions, etc., a satisfactory estimate of the total weight of logs to be carried cannot be visually determined with sufficient accuracy to be practicable.

Accordingly, the principal object of the present invention is to provide a vehicle for transporting logs having weighing apparatus incorporated therein for simply and expeditiously determining the total weight of logs constituting the vehicle load.

Another object of the invention is to provide a log carrying vehicle having a weighing system of the type referred to capable of operation while the vehicle is on the uneven terrain of a cutting site to give an accurate indication of the total weight of logs constituting the vehicle load.

A further object of the invention is to provide weighing apparatus for use in a load carrying vehicle of the type described embodying a novel combination of fluid pressure operated motors and an electrical control system therefor for securing an accurate weight indication of a total load and an indication of the relative unbalance of the load.

Additional objects of the invention are to provide a novel motor of the expansible chamber type particularly adapted for use in a vehicle-carried weighing apparatus of the type referred to; to provide a control system and indicating device for a weighing apparatus of the type referred to which is conveniently located adjacent the vehicle control station; and, to provide a rugged and durable weighing apparatus of general utility capable of withstanding extremely heavy and unbalanced loads in normal operation.

Other objects and advantages of the invention will become apparent during the course of the following description.

In the drawings I have shown one embodiment of the invention. In this showing

Fig. 1 is a side elevational view of a log carrying vehicle in accordance with the present invention showing both the vehicle and load, parts being broken away;

Fig. 2 is a fragmentary transverse cross-sectional view taken substantially along the line 2—2 of Fig. 1 and including a schematic showing of the weighing apparatus and its control system;

Fig. 3 is a fragmentary transverse cross-sectional view in a horizontal plane taken substantially along the line 3—3 of Fig. 1;

Fig. 4 is an enlarged vertical sectional view, largely schematic, through one of the motors illustrated in Fig. 2; and Fig. 5 is a detail cross-sectional view taken substantially along the line 5—5 of Fig. 3 and illustrating the mounting of one of the motors and its associated rub irons.

Referring to Fig. 1 the invention is shown in conjunction with a truck having a conventional chassis 10 supported by wheels 12, the axles 14 of which are mounted upon conventional leaf springs 16, and including a vehicle control station or cab 18 mounted on the forward portion of the chassis 10 and provided with the usual entrance door 20 and step 22. The vehicle thus far described is entirely conventional and may assume any of numerous forms, the one chosen herein for purposes of illustration being typical of those commonly employed in logging operations.

The load upon the truck as illustrated particularly in Figs. 1 and 2 comprises a plurality of heavy logs 24 stacked in pyramidal fashion upon a transverse beam 26 of H-shaped cross section commonly referred to in the art as a "log bunk." The outermost logs 24 of the bottom layer are retained in position upon the log bunk 26 by means of a pair of triangular shaped chocks 28 which are slidably mounted on the log bunk 26 and the position of which may be adjusted by means of transversely extending chains 30 having their terminal portions selectively engageable in keyhole slot structures 32 formed in the opposite ends of the log bunk 26 (Figs. 1 and 5).

It will be understood that at least two log bunks 26 spaced longitudinally of the chassis 10 are customarily provided in order to adequately support the logs 24, although for economy of illustration only one such log bunk is illustrated throughout the drawings. At least one additional log bunk will be employed and will substantially duplicate that illustrated.

As shown particularly in Figs. 2 and 3, the log bunk 26 and its load are normally supported by means of a fifth wheel structure including a generally circular upper wear disc 34 attached to the log bunk 26 in any suitable manner as by welding or the like, and a lower wear disc 36 similarly attached to the central portion of a hollow transverse beam 38 forming a part of a subframe 40. The subframe 40 in turn is suitably mounted in any convenient manner as by welding or the like to the vehicle chassis 10. A king pin 42 secured to the upper disc 34 projects downwardly through an aperture 44 formed in the lower disc 36 and extends loosely into a socket 46 formed within the hollow transverse beam 38 by means of a pair of channel section webs 48 welded or otherwise secured within the central portion of the latter.

The lower end of the king pin 42 is suitably threaded to receive a locknut 50 and washer 52 mounted thereon in such manner as to be spaced a short distance below the bottom surface of the lower disc 36. The king pin 42 thus serves to prevent lateral displacements of the log bunk 26 relative to the subframe 40 while permitting a limited amount of relative vertical movement therebetween due to the spacing of the locknut which permits the king pin 42 to move vertically within the aperture 44 and socket 46.

The fifth wheel structure thus far described constitutes the primary load transmitting means between the log bunk 26 and subframe 40 but, as will be more fully explained, the limited relative vertical movement of the parts is provided for the purpose of permitting the fifth wheel structure to be relieved of the load for the performance of a weighing operation.

In addition to the primary load transmitting fifth wheel structure, I have provided auxiliary load transmitting devices of the type known to the art as "rub irons," the nature of which may be best understood by reference to Figs. 2, 3 and 5. As shown in these figures, one pair of such rub irons is provided at each side of the subframe 40 and each includes an upper wear strip 54 suitably attached in any convenient manner to the bottom of the log bunk 26 and a lower wear strip 56 mounted for limited vertical movement relative to the subframe 40. These wear strips, as shown particularly in Fig. 3, are arcuate and concentric with the king pin 42.

As in the case of conventional rub irons, the improved devices disclosed herein are adapted to provide additional support to the log bunk 26 to compensate for any normal unbalance of the load thereon. As shown in Fig. 5, however, each of the lower wear strips 56 is provided with a pair of depending rod-like members 58 projecting downwardly through apertures 60 formed in the top surface of the subframe 40 and including stop pins 62 at their lower ends to permit limited vertical movement of the lower strips 56 relative to the subframe 40 while preventing relative lateral displacements therebetween.

Another aperture 64 intermediate the apertures 60 is provided in the subframe 40 to permit the passage therethrough of the piston rod or plunger 66 of a motor 68 which is preferably of the fluid pressure actuated, expansible chamber type. The motors 68 are secured in any convenient manner to the bottom portion of the subframe 40 and it will now be apparent that upon the actuation of both motors 68, the rub irons 54—56 at opposite sides of the subframe 40 will both be elevated a short distance sufficient to assume the load upon the log bunk 26 as the discs 34—36 of the fifth wheel structure become separated.

Referring to Fig. 4 the internal structure and arrangement of one of the fluid pressure actuated motors 68 is illustrated in detail although it will be understood that the showing is largely schematic and that no attempt has been made to accurately depict the various structural details such as gland packings, fastening devices, vents, and other elements which are common to all such fluid pressure actuated devices. Each motor 68 comprises a cylinder 69 having a working chamber 70 within which a piston 72 reciprocates, the latter being provided with one of the piston rods or plungers 66 extending upwardly through an upper cylinder head bearing 74. The working face of the piston 72 is provided with a suitable pressure seal which preferably takes the form of a leather cup packing 76 secured to the working face of the piston 72 as by means of a steel backing plate 78 and a plurality of screws 80.

A portion of the cylinder wall of each motor 68 is enlarged as indicated at 82 and provided with a fluid conduit 84 therein extending in a direction generally parallel to the longitudinal axis of the cylinder. At its bottom end the conduit 84 communicates with another conduit 86 extending approximately at right angles thereto and provided with an aperture 88 opening into the interior of the working chamber 70. An external conduit 90 has branches 91 connected as by means of suitable nipples 92 to the respective motor cylinders 69 preferably opposite the associated inlet apertures 88.

At its top end the conduit 84 opens into a fluid chamber 94 formed in the upper head of the cylinder 69, and another conduit 96, connected as by means of a nipple 98 to an external conduit 100, also opens into the chamber 94. At its lower end or point of entry into the chamber 94, the conduit 96 is provided with a valve seat 102 adapted to cooperate with a poppet type valve 104, the stem 106 of which is mounted for vertical reciprocation within a guide channel 108. The bottom end of the valve stem 106 projects into the interior of the cylinder 69 and is adapted to be abutted by the nonpressure face of the piston 72 at a predetermined point short of a full stroke of the latter to cause the valve head 104 to be seated against the valve seat 102 to cut off communication between the conduit 96 and the chamber 94 for a reason which will be hereinafter explained.

Also formed in the upper cylinder head of each cylinder 69, preferably on the side opposite the chamber 94, is another chamber 110 containing an electrical switch having a pair of relatively movable contacts 112 and 114. The contact 112 is preferably fixed with respect to the bottom surface of the chamber 110 and insulated therefrom as at 113, and its cooperating contact 114 is mounted at the end of a horizontal member 116 forming the top portion of an inverted L-shaped arm 118. The vertical portion of the arm 118 is adapted to reciprocate within a suitable guide 120 and has its bottom portion so disposed as to be abutted by the upper face of the piston 72 to open the contacts 112 and 114 slightly ahead of the closing of the valve 104 to interrupt communication between the conduit 96 and the chamber 94. The contacts 112 and 114 are adapted to be connected by any suitable means (not shown) to the exterior of the motor 68 in such manner as to form a part of an external electrical circuit to be described in detail below.

Referring to Fig. 2, there is illustrated schematically a preferred form of fluid system for actuating the motors 68 together with an electrical circuit for controlling such actuation. The actuating system is preferably hydraulic and includes a pump 122 having its suction side connected by means of a conduit 124 to a reservoir 128 adapted to contain the working fluid which is preferably of a type the characteristics of which are not readily affected by ordinary temperature changes, as for example a mixture of alcohol and glycerine.

The pressure side of the pump 122 is connected by means of another conduit 130 and check valve 132 to the conduits 100 which constitute inlets for the admission of pressure fluid to the motors 68.

The conduit 90 is provided at each end with a pressure gauge 136 and these gauges obviously are responsive to pressures in the respective motor chambers 70. A suitable spring pressed button type valve 138 is preferably interposed in the conduit 90 ahead of each gauge 136 to control the admission of pressure fluid to such gauges.

The conduit 90 (Figures 2 and 4) is connected to an exhaust conduit 140 leading to the reservoir 128. The conduit 140 is provided with a manually operable control valve 142 for controlling the flow of exhaust fluid therethrough from the motors 68. The conduit 90 is also provided with a valve 143 to prevent cross-flow of fluid between the chambers 70 of the two motors 68.

The power for operating the hydraulic system described above may be derived from any suitable source which is shown in Fig. 2 as preferably comprising an electric motor 144 suitably connected as at 146 to the pump 122 for actuating the latter. Any suitable source of electric energy such as the battery 148 having one terminal connected as by means of a conductor 147 to the ground and its other terminal connected by means of a conductor 149 to the motor 144 may be employed to drive the latter.

The electrical circuit illustrated in Fig. 2 is of the single wire type, and includes a manually operable control switch 150 interposed in a conductor 152 which leads from the motor 144 to a pair of conductors 154. Each of the conductors 154 in turn leads to one of the contacts 112 of the piston actuated switches previously described, the other contact 114 of each switch respectively being indicated as being grounded as at 156. It will thus be apparent that the electrical circuit for controlling the energization of the motor 144 includes the manually operable control switch 150 in series with a pair of parallel-connected switches 112—114 which are adapted to be automatically actuated by the pistons 72 of their associated hydraulic motors 68.

*Operation*

In order to facilitate the transportation of logs from the cutting site to the saw mill or other central location the vehicle, which is of relatively rugged construction, may be driven directly to the cutting site and a selected number of logs 24 placed in the indicated manner upon the log bunks 26. The chocks 28 are adjusted to bear against the outermost logs of the bottom layer and the chains 30 are suitably secured in the smaller portions of the keyhole slots 32 to retain the chocks in position. At this time any unbalance of the load of logs will be assumed in the usual manner by one or more of the rub irons 54—56 which together with the fifth wheel structure 34—36 support the entire load upon the subframe 40.

After the logs have been properly positioned in this manner, the total weight of the load may then be determined by actuating the motors 68 to cause the latter to assume the entire load on the vehicle by disengaging the wear discs 34—36 of the primary load supporting fifth wheel structure. At the beginning of this operation it will be noted that the pistons 72 and plungers 66 are substantially fully retracted within their cylinders 69 so that the valve 104 is not seated against the valve seat 102 to preclude the admission of pressure fluid from the conduits 100 and 96 into the chamber 94, and the electrical contacts 112—114 are likewise closed to complete the connection from the conductors 154 to the grounds 156.

The manually operable control switch 150 may then be closed to initiate operation of the electric motor 144 which in turn drives the pump 122 and delivers fluid from the reservoir 128 through the conduits 124 and 130, the valve 132, and the conduits 100. At this time the valves 142 and 143 are tightly closed so that no movement of fluid from the working chambers 70 of the motors 68 may take place through the exhaust conduits 90. Accordingly the pressure fluid in the conduits 100 enters through the conduits 96 past the valve seats 102 into the chambers 94 and thence flows through the conduits 84 and 80 and the apertures 88 into the working chambers 70 of the motors 68. As the working chambers 70 of the fluid motors 68 fill with pressure fluid, the pistons 72 are forced upwardly therein causing the plungers 66 to extend through the apertures 64 (Figure 5) and contact the lower wear strips 58 to raise the log bunk 26 and its load off the fifth wheel structure 34—36.

During the operation of the pump 122 to force pressure fluid into the working chambers 70 of the fluid motors 68, it is most probable that the load of logs upon the log bunks 26 will be unbalanced so that a greater resistance to the upward movement of the plungers 66 will be offered by one of the wear strips than by the other.

For this reason it is also most likely that the wear strip offering the least resistance to upward movement of its associated plunger 66 will be substantially fully raised before the other plunger 66 commences to move since the pressure inlet conduits 100 are cross-connected and equal fluid pressure prevails throughout the pressure side of the system.

Accordingly, as the piston 72 of the motor 68 which is at the lighter side of the log bunk 26 reach a position short of full stroke and just before it closes its associated valve 104, its rear or lower pressure face will contact the bottom end of the rod 118 to open the associated switch 112, 114. The other such switch will remain closed and accordingly the pump will continue to operate. After the first switch 112, 114 has opened, the operator will normally close valve 143 to prevent later cross flow of liquid between the two motor cylinders.

Since the valve 104 of the motor adjacent the lighter side of the load will still be slightly open, fluid will continue to enter the chamber 70 of such motor until further upward movement of its poston closes the valve 104. This precludes the further entry of pressure fluid from the conduits 100 and 96 into the chamber 94, the conduits 84 and 86, the aperture 88, and the working chamber 70 of that motor 68. As no more pressure fluid can be admitted to that motor, the line pressure will rise causing additional pressure fluid to flow through the other conduit 100 and through a similar series of conduits into the working chamber 70 of the motor 68 at the heavy side of the log bunk 26.

As previously stated, the switch 112, 114 of the motor 68 adjacent the heavy side of the load will have remained closed after the other switch 112, 114 was opened. This is obviously due to the fact that equal lifting pressures will have existed in both motors 68 and while the pressure reached at the time of the opening of the first switch 112, 114 will have been sufficient to elevate the lighter side of the load, it will have been insufficient to elevate the heavier side of the load. Accordingly the piston 72 of the motor at the heavier side of the load will not have moved upwardly to a position in which it would operate its switch 112, 114.

Accordingly the motor 144 will remain in operation to continue to operate the pump 122 and supply fluid to pipes 130 and 100 to further build up the pressure in such lines and in the motor at the heavier side of the load. The forcing of fluid into the latter motor will finally move the piston 72 of such motor to the point where it will open its associated switch 112, 114 just prior to the closing of the associated valve 104. Both switches 112, 114 will now be in open position and the motor 144, will cease to operate. While the valve 104 will be not quite in closed position, the weight of the heavy side of the load will be supported by the associated piston 72, and a reverse flow of fluid from the motor at the heavy side of the load will be prevented by the check valve 132.

With the parts in the condition as described above, that is, with both of the fluid motors 68 actuated to positions in which the entire weight of the load on the log bunks 26 supported by these motors through the rub irons 54—56 and plungers 66, the total weight of the load upon the vehicle may be readily determined by manual operation of the spring pressed valves 138 to admit pressure fluid to the gauges 136. As indicated above, the gauges 136 are preferably calibrated to indicate in tons the weights of the loads supported by the respective motors 68. The gauges are preferably located within the control station or cab 18 at a point convenient to the operator of the vehicle. Similarly, the control switch 150 is also located preferably within the cab 18 as is the exhaust control valve 142.

Each gauge 136 is calibrated in accordance with the load supported by the motors whose pressure it indicates. The readings of the two gauges 136 are then added to determine the total load on the log bunk 26. Of course, it will be necessary to use a second log bunk, but such element and the weighing mechanism associated therewith will be duplicates of the parts described. The gauges of such second weighing mechanism are similarly read to determine the total load supported thereby. The readings of all of the gauges are added together to determine the total load carried by the truck.

It is to be particularly noted that the weights indicated upon the gauges 136 will be accurate regardless of the uneven character of the terrain upon which the vehicle is resting or the unbalance of the load of logs thereon. This result follows from the fact that substantially the entire weight of the load is transmitted directly to the fluid within the pressure conduits of the system and also to the fact that substantially no excess fluid pressure will be built up in the system on account of the pistons 72 having reached their extreme full stroke positions.

After a weight indication has been obtained from the gauge 136, it is only necessary for the operator to open the valves 142 and 143 which permits the fluid under pressure within the working chambers 70 of both motors 68 to be exhausted through the apertures 88 and conduits 90 and 140 to the reservoir 128. The switch 150 should, of course, be opened prior to opening the valve 142 in order that the resultant closing of one or both of the piston-actuated switches will not once again initiate operation of the electric motor 144 and pump 122, although, of course, no harm will be done to the system should this inadvertently take place. After the switch 150 and valves 142 and 143 have been opened, the log bunk will descend slowly until the load is once again assumed by the fifth wheel structure and the rub irons and the fluid motors 68 will automatically return to their original condition in readiness for a subsequent weighing operation.

I claim:

1. Apparatus for weighing an unbalanced load comprising a load-receiving member, primary load-supporting means releasably supporting said member, a plurality of auxiliary load-supporting devices, fluid motors including cylinders having pistons and piston rods projecting therefrom and engageable respectively with said devices to assume the load on said member, a fluid pump having an electric motor connected in driving relation thereto, parallel inlet conduits connecting the working chambers of said cylinders to the pressure side of said pump and each including a valve therein operable by movement of the piston of the associated motor to a predetermined position to preclude flow of fluid therethrough, parallel exhaust conduits connected to the working chambers of said cylinders and including manually operable control valve means therein, a source of electrical energy, an electrical circuit interconnecting said source and said electric motor including a plurality of automatic switches connected in parallel therein and respectively operable by the pistons of said motors after they assume said load to break said electrical circuit only upon movement of all said pistons, and load-calibrated gauge means responsive to pressures in the working chambers of said motors.

2. Apparatus for weighing an unbalanced load comprising a load-receiving member, a plurality of load supporting devices connected thereto, fluid motors including cylinders having pistons and piston rods projecting therefrom and engageable respectively with said devices to assume the load on said member, a fluid pump having an electric motor connected in driving relation thereto, parallel inlet conduits connecting the working chambers of said cylinders to the pressure side of said pump and each including a valve therein operable by movement of the piston of the associated motor to a predetermined position to preclude flow of fluid therethrough, a source of electrical energy, an electrical circuit interconnecting said source and said electric motor including a plurality of automatic switches connected in parallel therein and respectively operable by the pistons of said motors after they assume said load to break said electrical circuit only upon movement of all said pistons, and a load-calibrated gauge responsive to pressures in the working chamber of each of said motors.

3. Apparatus for weighing an unbalanced load comprising a load-receiving member, a plurality of fluid motors operable to support said member and a load thereon, a source of pressure fluid, an electrically operated pump associated therewith, parallel inlet conduits connecting said motors to said source of pressure fluid and each including valve means therein operable upon actuation of its associated motor to a predetermined position to preclude flow of fluid therethrough, a source of electrical energy, an electrical circuit interconnecting said last named source and said electrically operated pump including a plurality of switches connected in parallel therein and respectively operable by said motors to break said electrical circuit only upon actuation of all said motors, and gauge means responsive to fluid pressures in said motors for indicating the weight of the load.

4. Weighing apparatus comprising a plurality of fluid motors operable to support a load, a source of pressure fluid, parallel inlet conduits connecting said motors to said source of pressure fluid and each including valve means therein operable upon actuation of its associated motor to a predetermined position to preclude flow of fluid therethrough, electrically operated means for controlling the flow of pressure fluid from said source through said conduits, an electrical circuit operatively associated with said last named means and including a plurality of switches connected in parallel therein and respectively operable by said motors to break said electrical circuit only upon actuation of all said motors, and gauge means responsive to fluid pressures in said motors for indicating the weight of the load.

5. Weighing apparatus comprising a plurality of fluid motors adapted to support a load to be weighed, a source of pressure fluid, conduits connecting said motors to said source, each conduit including means operable upon actuation of its associated motor to a predetermined position to preclude flow of fluid therethrough, means for effecting the flow of pressure fluid from said source through said conduits, and means operatively associated with each of said motors and respectively operable to render said flow-effecting means ineffective only upon actuation of all said motors, and means responsive to fluid pressure in said motors for indicating the weight of the load.

CHARLES S. POOLE.

REFERENCES CITED

The following references are of record in the file of this patent:

UNITED STATES PATENTS

| Number | Name | Date |
|---|---|---|
| 327,598 | Sanford | Oct. 6, 1885 |
| 1,743,436 | Davis et al. | Jan. 14, 1930 |
| 1,793,808 | Knox | Feb. 24, 1931 |
| 2,020,307 | Fitch | Nov. 12, 1935 |
| 2,041,726 | Pray | May 26, 1936 |
| 2,109,460 | Brasher | Mar. 1, 1938 |
| 2,244,373 | Powers | June 3, 1941 |
| 2,365,589 | Poston et al. | Dec. 19, 1944 |
| 2,380,973 | Kopp | Aug. 7, 1945 |
| 2,380,975 | Kopp | Aug. 7, 1945 |

FOREIGN PATENTS

| Number | Country | Date |
|---|---|---|
| 301,670 | Great Britain | Dec. 6, 1928 |
| 416,063 | Great Britain | Sept. 10, 1934 |